Figure 2B:
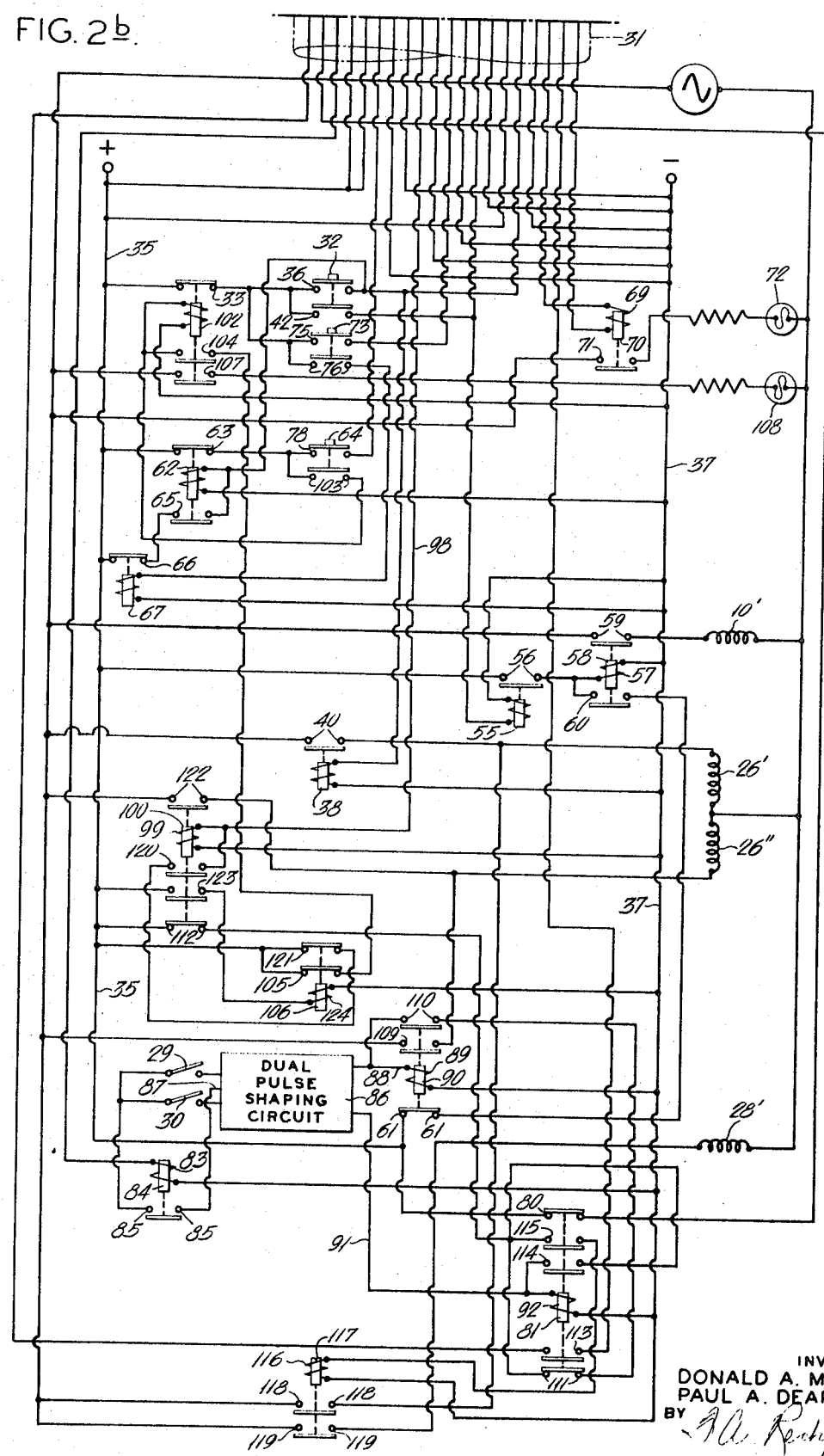

United States Patent
McNeal et al.

[15] 3,665,954
[45] May 30, 1972

[54] PIG SYSTEM

[72] Inventors: Donald A. McNeal, Brookhaven, Pa.; Paul A. Dearry, Wilmington, Del.

[73] Assignee: Sun Oil Company, Philadelphia, Pa.

[22] Filed: Feb. 17, 1971

[21] Appl. No.: 116,079

[52] U.S. Cl. ................................137/268, 15/104.06
[51] Int. Cl. ...................................................F17d 3/00
[58] Field of Search ..........137/268; 15/104.06 A, 104.06 B, 15/3.5, 3.51; 73/3

[56] References Cited

UNITED STATES PATENTS

| | | |
|---|---|---|
| 3,021,703 | 2/1962 | Pfrehm .......................................73/3 |
| 3,273,375 | 9/1966 | Howe..........................................73/3 |
| 3,421,360 | 1/1969 | Luse et al. ..................................73/3 |
| 3,455,143 | 7/1969 | Shamp........................................73/3 |
| 3,580,045 | 5/1971 | Pfrehm.......................................73/3 |

Primary Examiner—M. Cary Nelson
Assistant Examiner—Robert J. Miller
Attorney—George L. Church, Donald R. Johnson, Wilmer E. McCor-quodale, Jr. and Frank A. Rechif

[57] ABSTRACT

In a system for loading a liquid into a tank truck by means of a pipeline, a pig is used for pushing product through the line toward the truck. This pig is stored at the source end of the line and is caused to move through the line first toward the truck end, and then back to its storage location at the source end, all in response to the operation of a "pig start" pushbutton.

12 Claims, 5 Drawing Figures

Patented May 30, 1972
3,665,954
3 Sheets-Sheet 1
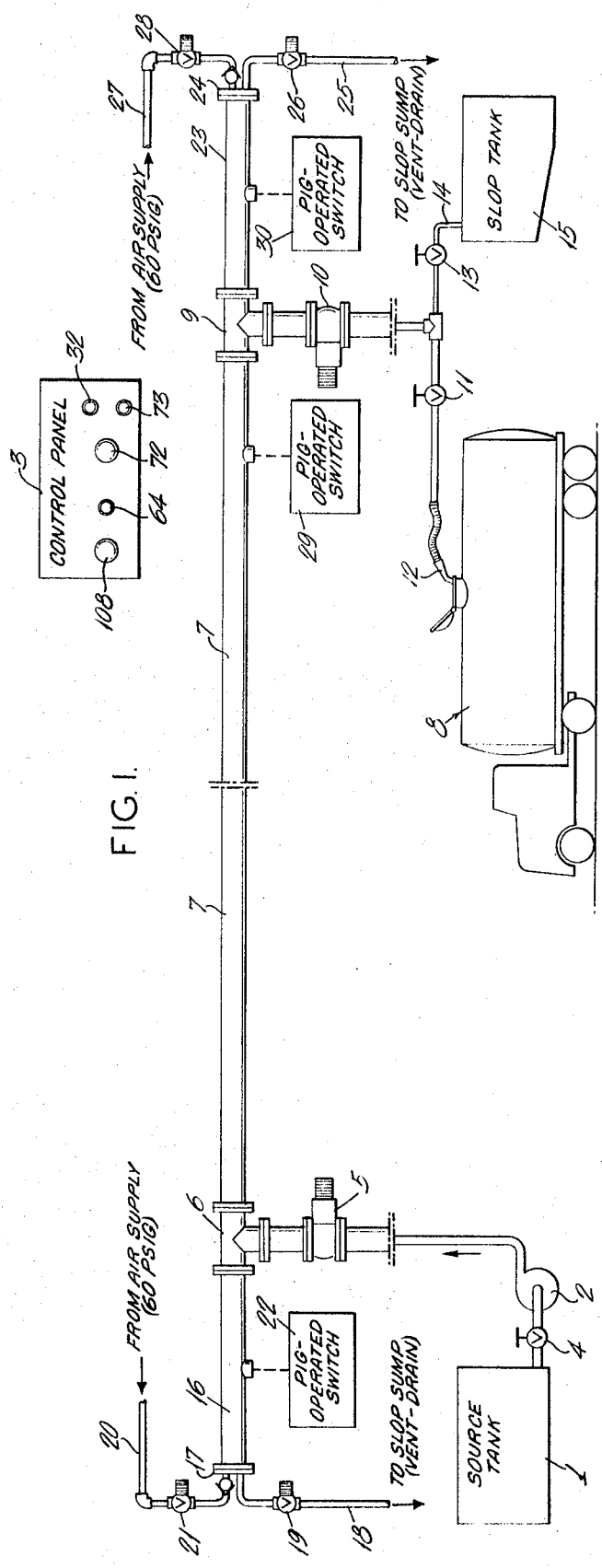
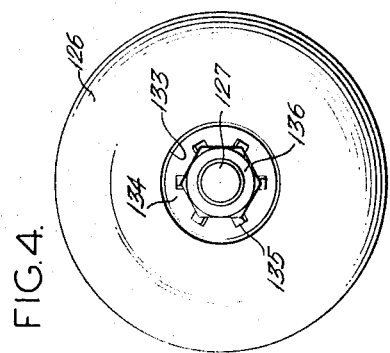
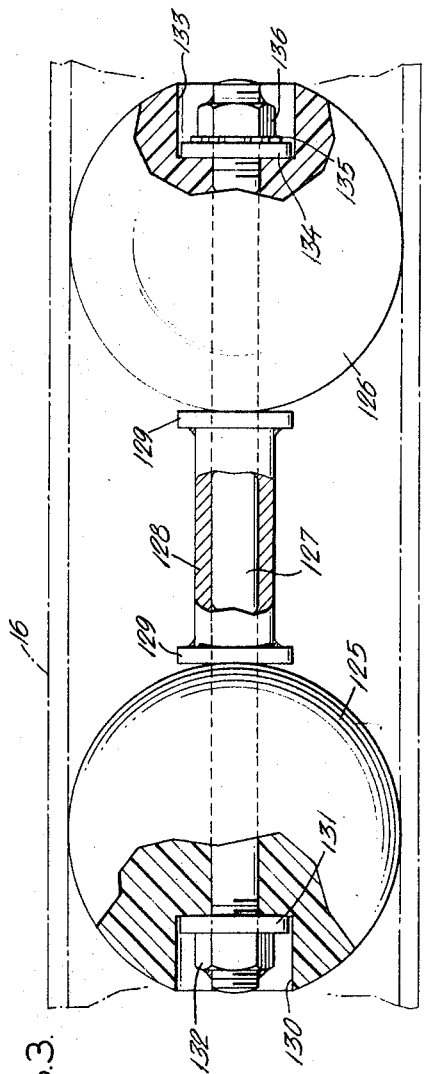
INVENTORS:
DONALD A. McNEAL
PAUL A. DEARRY
BY
ATTY.

FIG. 2ª.
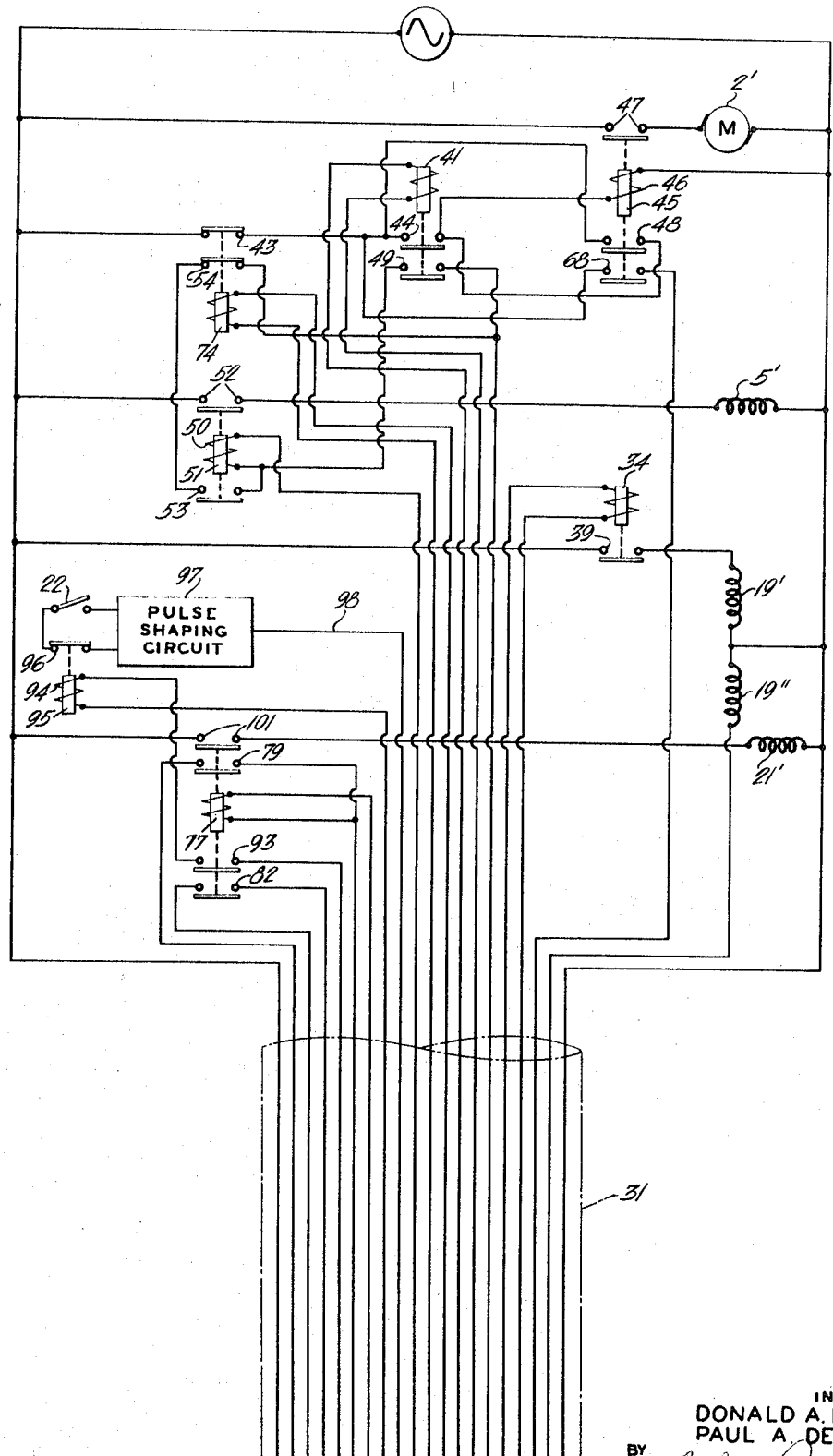
INVENTORS:
DONALD A. McNEAL
PAUL A. DEARRY
ATTY.

INVENTORS:
DONALD A. McNEAL
PAUL A. DEARRY
BY
ATTY

PIG SYSTEM

This invention relates to a pig system, and more particularly to a system of this type for loading a liquid into a tank truck by means of a pipeline.

In the distribution of petroleum products, it is a fairly common practice to mix or formulate any grade of product desired, as the need arises, in a source tank, the quantity of product so formulated being exactly that required to fill one tank truck. The source tank may be some distance away from the truck loading rack, such as 500 feet. Since only the exact quantity of product necessary for filling a truck has been formulated in the source tank, some means must be provided for moving the final increment of liquid through the pipeline to the truck, after the tank has been pumped dry; in this connection, it is pointed out that the volume of liquid contained in 500 feet of 4-inch diameter pipe is approximately 325 gallons. In addition to this "topping off" of the truck, it is of course desirable to clean the line after each delivery, in order to prevent contamination of one product by a different product which was previously present in the line.

According to this invention, a pig is stored in what amounts to a continuation of the pipeline, at the source tank end thereof. When it is desired to "top off" the tank truck to complete a delivery, the main pump is stopped and, in response to operation thereafter of a "pig start" pushbutton, compressed air is applied to one side of the pig to drive it through the line to the loading rack or tank truck end, the pig then pushing the liquid ahead of it toward the truck. When the pig reaches the loading rack end of the line, compressed air is automatically applied to the other side of the pig to drive it through the line in the opposite direction, thereby to return it to its starting point (at the source tank end of the line).

A detailed description of the invention follows, taken in conjunction with the accompanying drawings, wherein:

FIG. 1 is a diagrammatic illustration of a tank truck loading system utilizing this invention;

FIGS. 2a and 2b, taken together, comprise a schematic of the control circuit utilized in the invention; and FIGS. 3 and 4 are elevational views of a pig utilized in the invention.

First referring to FIG. 1, which is a diagrammatic illustration of a tank truck loading system, the items at the left-hand side of this figure are all located at the blending or source tank end of the system, while the items at the right-hand side are all located at the opposite or loading rack end of the system.

The source tank 1 is used to mix or formulate any grade of product which is desired to be shipped by tank truck; this tank may be located about 500 feet away from the truck loading rack. Once an order is received and processed, the ordered product is formulated in the source tank 1 in the exact amount called for by the order.

A loading pump 2, which is remotely operated from a control panel 3 located near the loading rack, draws its intake or suction from tank 1 through a manually operated gate valve 4. The operation of this pump will be described further hereinafter. The discharge of pump 2 is fed through a pump discharge valve 5 (solenoid-operated) to the smaller-diameter arm of a reducing tee fitting or coupling 6, and thence through a pipeline 7 (for example, 4 inches in diameter, about 500 feet in length, and also coupled to the tee) to the loading rack, at which a tank truck 8 is positioned for loading. A guard bar, 1½ × ½ × about 3 inches long, is welded across the smaller-diameter arm of tee 6, flush with the inside diameter of the run of the tee.

At the loading rack end of line 7, a reducing tee fitting or coupling 9 (similar to tee 6, and including a similar guard bar) is coupled to line 7, and from the smaller-diameter arm of this tee a fluid conduit extends through a loading rack valve 10 (solenoid-operated) and a manually operated shutoff valve 11 to a spout or nozzle 12 suitable for dispensing the fluid into the tank truck 8. A parallel or bypass conduit (connected essentially in parallel with items 11 and 12, and useful mainly in extraordinary or emergency situations) extends from a point between valves 10 and 11, through a manually operated valve 13 and a smaller-diameter line 14 to a slop tank 15. Thus, if the tank truck 8 becomes full while the pump 2 is still running, valve 11 can be closed and valve 13 opened to divert the excess product to the slop tank 15.

At the blending or source tank end of line 7, a rather short piece 16 of 4-inch diameter pipe (some 4 to 6 feet in length, for example) extends between the tee 6 and a flange 17. A pig, to be further described hereinafter, is normally "stored" in the length of pipe 16. A system for operating this pig, which system will be later described, is remotely operated from the control panel 3. Two other lines, each three-fourths inch in diameter for example, are coupled to the flange 17. One is a vent-drain line 18 leading to a slop sump, and has therein a source tank vent valve 19 (solenoid-operated); the other is an air supply line 20 (connected to a compressed air supply of 60 psig), which has therein a source tank air supply valve 21 (also solenoid-operated) and a check valve (schematically indicated) to keep oil from the air supply. A pig-operated switch 22, which is operated by the passage of a pig thereby, is associated with pipe 16. This switch will be further referred to hereinafter.

At the loading rack end of line 7, a short piece 23 of 4-inch pipe (similar to pipe 16) extends between the tee 9 and a flange 24. Two other lines, one three-fourths inch in diameter for example, and one 1½ inches in diameter for example, are coupled to the flange 24. The 1½ inches one is a vent-drain line 25 leading to a slop sump, and has therein a rack vent valve 26 (solenoid-operated); the three-fourth-inch one is a compressed air supply line 27, which has therein a loading rack air supply valve 28 (also solenoid-operated) and a check valve (schematically illustrated) to keep the air supply free of oil. A pig-operated switch 29, operated by the passage of a pig thereby, is associated with line 7, a short distance from tee 9 in the direction of the source tank, and a similar pig-operated switch 30 is associated with pipe 23. Switches 29 and 30 will be further referred to hereinafter.

A detailed description of the operation of the invention will be hereinafter given, in connection with the circuit diagram of FIGS. 2a–2b. However, a brief, general description now follows. Assuming that the truck 8 is positioned for loading, the loading pump 2 is started to empty the source tank 1 into the truck 8 by way of line 7, valves 4, 5, 10, and 11 all being open and valves 13, 19, 21, 26, and 28 closed. When tank 1 is empty, pump 2 is stopped, and a pig is caused to move through line 7, from its "home" in pipe 16 toward the rack end of line 7. In so doing, it pushes the liquid product ahead of it to "top off" the truck 8. Any excess is pushed to the slop tank 15, by closing valve 11 and opening valve 13. When the pig reaches the loading rack end of the line, it is returned automatically to its "home" in pipe 16.

Refer now to the circuit diagram of FIGS. 2a–2b. The components in FIG. 2a are located in a relay box adjacent the source tank end of the system, while those in FIG. 2b are located at a control shelter, near the loading rack end of the system. A multiconductor cable 31 interconnects the components located at the two ends of the system.

When the system is not in use, the vent 19 at the source tank end and the vent 26 at the rack end are both open. These vents are both solenoid-operated, being of the latch-open, trip-close type; the "open" coil 19'' for vent 19 and the "open" coil 26'' for vent 26 have both been energized near the end of the previous operation, as will be described hereinafter, so that these vents are at this time latched open. All other solenoid valves are closed, these latter being of the energize-to-open type, and being unenergized when the system is not in use. At this time, the pig (whose construction will hereinafter be described) is in its rest or "home" or stored position, in pipe 16, between tee 6 and flange 17; this is at the source tank end of the line 7.

Assuming that the order has been formulated in source tank 1 and that the tank truck 8 is positioned for loading, a "start" pushbutton 32, located in the control panel 3 (at the control shelter, near the loading rack) is depressed to start the operation. This pushbutton is illustrated as operating a double-pole, single-throw momentary contact switch. The normally closed relay contacts 33 being closed, an energization circuit is completed for vent trip relay 34 when pushbutton 32 is operated, this circuit extending from the positive bus 35 through the upper pair of contacts 36 of pushbutton switch 32, through the winding of relay 34 to the negative bus 37; likewise, an energization circuit is completed for vent trip relay 38 through contacts 36 and through the winding of this latter relay to bus 37. The closing of contacts 39 of relay 34 completes an a.c. energization circuit for "trip" winding 19' of vent valve 19, causing this valve to trip closed; the closing of contacts 40 of relay 38 completes an a.c. energization circuit for "trip" winding 26' of vent valve 26, causing this latter valve to trip closed.

When "start" pushbutton 32 is operated, an energization circuit is completed for relay 41, from bus 35 through the lower pair of contacts 42 of switch 32, through the winding of relay 41 to bus 37. The normally closed relay contacts 43 being closed, closure of contacts 44 of relay 41 completes an a.c. energization circuit for winding 46 of a motor contactor relay 45, closing the contacts 47 of this latter relay and energizing the motor 2' for pump 2 from the a.c. line. This starts pump 2. Contactor relay 45, when energized, locks itself in through a pair of locking contacts 48 and the closed contacts 43.

When relay 41 is energized, closure of its contacts 49 completes an energization circuit through the winding 50 of a relay 51, causing the contacts 52 of this latter relay to close. Closure of contacts 52 energizes the solenoid 5' of ball valve (pump discharge valve) 5, opening this latter valve. Relay 51, when energized, locks itself in through a pair of locking contacts 53 and a pair of normally closed relay contacts 54.

Operation of "start" pushbutton 32 completes an energization circuit for relay 55, from bus 35 through contacts 42 of switch 32, through the winding of relay 55 to bus 37. Closure of the contacts 56 of relay 55 completes an obvious energization circuit through winding 57 of relay 58. Closure of contacts 59 of relay 58 energizes the solenoid 10' of ball valve (loading rack valve) 10, opening this latter valve. Relay 58, when energized, locks itself in through a pair of locking contacts 60 and a pair of normally closed relay contacts 61.

When pushbutton 32 is operated, an energization circuit is completed for a pig hold relay 62, through the switch contacts 36 and through the winding of relay 62; energization of relay 62 opens its normally closed contacts 63 and thus prevents any circuit being completed by operation of a "pig start" pushbutton 64 whose contacts are connected in series with contacts 63. Pig hold relay 62, when energized, locks itself in through a pair of locking contacts 65 and a pair of normally closed contacts 66 of a pig release relay 67.

When the motor contactor relay 45 is energized, closure of its contacts 68 completes an a.c. energization circuit through closed contacts 43 to the winding 69 of a relay 70; closure of the contacts 71 of relay 70 completes an a.c. energization circuit through the pump indicating light 72 on the control panel 3 and this light goes on, indicating that the pump 2 is "on".

The vents 19 and 26 and air source valves 21 and 28 at both ends of the line 7 being closed, and valves 5 and 10 both being open, pump 2 pumps product from the source tank 1 through line 7 and into tank truck 8.

When pumping of the product from source tank 1 has been completed, a "stop" pushbutton 73, located in the control panel 3, is depressed. This pushbutton, like pushbutton 32, is illustrated as operating a double-pole, single-throw momentary contact switch. The normally closed relay contacts 33 still being closed, an energization circuit is completed for relay 74, from the positive bus 35 through the upper pair of contacts 75 of pushbutton switch 73, through the winding of relay 74 to the negative bus 37. Energization of relay 74 causes opening of its normally closed contacts 43 and 54, previously mentioned. Opening of the contacts 43 releases motor contactor relay 45, opening its contacts 47 and deenergizing pump motor 2'. Pump 2 thus shuts down.

Opening of the contacts 54 releases relay 51, opening its contacts 52 and deenergizing the ball valve solenoid 5', causing the pump discharge valve 5 to close.

Opening of contacts 43 breaks the energization circuit for relay 70; opening of the contacts 71 then breaks the circuit through light 72, and this light goes out.

Upon operation of pushbutton 73, an energization circuit is completed for the pig release relay 67, from the positive bus 35 through the lower pair of contacts 76 of pushbutton switch 73, through the winding of relay 67 to the negative bus 37. Energization of relay 67 causes opening of its normally closed contacts 66, previously mentioned. Opening of contacts 66 releases the pig hold relay 62, allowing its contacts 63 to reclose.

After the pump is stopped, the pig system is put into operation, for automatic "topping off" of the truck. This is done by depressing the "pig start" pushbutton 64, located in the control panel 3. Pushbutton 64 is illustrated as operating a double-pole, single-throw momentary contact switch. Relay contacts 63 being closed, an energization circuit is then completed for a relay 77, from the positive bus 35 through the upper pair of contacts 78 of pushbutton switch 64, through the winding of relay 77 to the negative bus 37. Relay 77, when energized, locks itself in through a pair of locking contacts 79 and the normally closed contacts 80 of a relay 81.

Closure of contacts 82 of relay 77 completes an energization circuit for winding 83 of a relay 84, causing the contacts 85 of this latter relay to close. One terminal of each of the pig-operated switches 29 and 30 (which are located adjacent the rack end of line 7; see FIG. 1) is connected to a separate respective one of the two "hot" inputs of a dual pulse shaping circuit 86 (which may be termed a "bilogic control circuit"). The remaining terminals of these two switches are connected together and in series with the relay contacts 85 to a "common" input 87 of the circuit 86; thus, when contacts 85 are closed as above described, the pig switches 29 and 30 are rendered effective. Therefore, operation of the "pig start" pushbutton 64 results in pig-operated switches 29 and 30 being set up or rendered effective. The dual pulse shaping circuit 86 is a solid-state circuit, energized by means of connections (not shown) to the buses 35 and 37 and also to the a.c. power supply lines.

The primary function of the circuit 86 is to amplify and lengthen the pulses produced by momentary pig-actuated operation of the (normally open) switches 29 and 30, such that the enhanced pulses may be used to energize or operate relays. Thus, when the pig, passing through line 7, closes and then opens switch 29, a pulse is developed on the circuit 86 output lead 88 which flows through the winding 89 of a relay 90 and actuates this relay. Likewise, when the pig closes and then opens switch 30, a pulse is developed on the circuit 86 output lead 91 which flows through the winding 92 of relay 81 and actuates this relay.

Closure of contacts 93 of relay 77 completes an energization circuit for winding 94 of a relay 95, causing the normally closed contacts 96 of this relay to open. One terminal of the pig-operated switch 22 (which is located adjacent the source tank end of line 7, within pipe 16; see FIG. 1) is connected to one of the two input leads of a pulse shaping circuit 97 (which may be termed a "monologic control circuit"). The remaining terminal of switch 22 is connected in series with the relay contacts 96 to the other input lead of circuit 97; thus, when contacts 96 are opened as above described, the pig switch 22 is rendered ineffective. Therefore, operation of the "pig start" pushbutton 64 results in pig-operated switch 22 being rendered ineffective. The pulse shaping circuit 97 is a solid-state circuit, energized via connections (not shown) to the buses 35 and 37 and also to the a.c. power supply lines.

Circuit 97 operates somewhat similarly to circuit 86, previously described. Assume for the moment that contacts 96 are closed, so that the description of this part of the circuit may be carried forward. In this case, when the pig closes and then opens switch 22, a pulse would be developed on the circuit 97 output lead 98 which would flow through the winding 99 of a relay 100 and would actuate this relay.

Closure of contacts 101 of relay 77 completes an a.c. energization circuit for the solenoid winding 21' of the source tank end air supply valve 21, opening this valve. As a result, compressed air is admitted to the left-hand end of pipe 16, displacing the pig from its stored position in this pipe and moving it through the loading line 7 toward the rack end, pushing the product (oil) in this line into the truck 8. This "tops off" the truck.

Relay contacts 63 being closed, operation of pushbutton 64 also completes an energization circuit for a relay 102, from the positive bus 35 through the lower pair of contacts 103 of pushbutton switch 64, through the winding of relay 102 to the negative bus 37. Relay 102, when energized, locks itself in through a pair of locking contacts 104 and the normally closed contacts 105 of a time delay relay 106. The relay 106 provides an "on" time delay of 5 seconds, between the time its winding is energized and the time its contacts such as 105 operate. The normally closed contacts 33 previously referred to, which are in series with the contacts of pushbutton switches 32 and 73, are operated by relay 102. Thus, when relay 102 is energized as above described, the contacts 33 open, preventing any circuit being completed by operation of either "start" pushbutton 32 or "stop" pushbutton 73.

Energization of relay 102 also closes its contacts 107, completing an a.c. energization circuit through the "pig on" indicating light 108 on the control panel 3. This light then goes on, indicating "pig on", i.e., pig system in operation.

When the pig passes by the pig-operated switch 22 at the source tank end, this switch is closed and then opened as a result of such passage, but no action results because this switch is then rendered ineffective as a result of contacts 96 being open (relay 95 being energized at this time).

When the pig, being pushed by the compressed air through line 7, passes by the normally open pig-operated switch 29 near the rack end of the line, this switch is closed and then opened as a result of such passage. Since contacts 85 are closed at this time (rendering switch 29 effective), the operation of switch 29 actuates relay 90, opening its normally closed contacts 61. The opening of contacts 61 releases relay 58, opening its contacts 59 and deenergizing the solenoid 10' of ball valve 10. The loading rack ball valve 10 then closes.

Actuation of relay 90 causes closing of its contacts 109, completing an a.c. energization circuit to the "open" coil 26'' of rack vent valve 26. Rack vent valve 26 then opens to the slop sump, and latches open, simultaneously with the closing of ball valve 10 (previously described).

Relay 90, when energized, locks itself in through a pair of locking contacts 110, the normally closed contacts 111 of relay 81, and the normally closed contacts 112 of relay 100.

When the pig reaches tee 9 it passes on into pipe 23. When the pig passes by the normally open pig-operated switch 30, this switch is closed and then opened as a result of such passage. Since switch 30 is effective at this time (contacts 85 being closed), the operation of switch 30 actuates relay 81, opening its normally closed contacts 80. The opening of contacts 80 releases relay 77, opening its previously closed contacts 101 and thus deenergizing the solenoid 21' of the source end air supply valve 21, causing this valve to close. This closes off the compressed air which was pushing the pig, so the pig comes to a stop against the flange 24.

Actuation of relay 81 causes closing of its contacts 113, completing an a.c. energization circuit to the "open" coil 19'' of source vent valve 19. Source tank vent valve 19 then opens, and latches open.

Relay 81, when energized, locks itself in through a pair of locking contacts 114 and the normally closed contacts 112 of relay 100.

The opening of contacts 111 when relay 81 is energized releases relay 90, which in turn opens its contacts 109 and removes the energization voltage from "open" coil 26'' of the rack vent valve 26.

As previously mentioned, the operation of pig-operated switch 30 by the pig results in the release of relay 77, opening its contacts 82 and releasing relay 84; the contacts 85 of relay 84 then open and render the pig-operated switches (pig switches) 29 and 30 ineffective. Also, when relay 77 releases as aforementioned, its contacts 93 open to release relay 95, causing its normally closed contacts 96 to reclose. This renders pig switch 22 effective. Thus, the pig switches or pig-operated switches are set up for a pig run from the rack end back to the source tank end; switches 29 and 30 are rendered ineffective and switch 22 is rendered effective.

The actuation of relay 81 (in response to closing of switch 30) also causes closing of its contacts 115, which completes an energization circuit for the winding 116 of a time delay relay 117, as follows: negative bus 37, winding 116, closed contacts 115, the normally closed contacts 112 of relay 100, positive bus 35. After an "on" time delay of 1½ minutes, relay 117 closes its contacts 118, and also closes its contacts 119. It will be remembered that source vent valve 19 opens when relay 81 is actuated. This time delay (of relay 117) allows the line 7 to become exhausted (via vent valve 19) before the pig is started back toward the source tank end.

The closing of contacts 118, after the time delay, completes an a.c. energization circuit for "trip" winding 26' of vent valve 26, causing this rack vent valve to trip closed.

The closing of contacts 119 of the time delay relay 117 completes an a.c. energization circuit for the solenoid winding 28' of the rack end air supply valve 28, opening this valve. As a result, compressed air is admitted to the right-hand end of pipe 23, displacing the pig from its temporary position in this pipe, so that it starts its run back through the loading line from the rack end toward the source tank end.

When the pig passes by pig-operated switch 30 at the rack end, and also passes by pig-operated switch 29 at this same end, the pig operates these respective switches, but no action results in either case because these switches are at this time both rendered ineffective (contacts 85 being open).

When the pig, being pushed by the compressed air from right to left through line 7, reaches tee 6 it passes on into pipe 16. When the pig passes by the pig-operated switch 22, this normally open switch is closed and then opened as a result of such passage. Since switch 22 is effective at this time (contacts 96 being closed), the operation of switch 22 actuates relay 100, opening its normally closed contacts 112. The opening of contacts 112 releases relay 81 and also deenergizes relay 117, as well as releasing relay 90 (if the latter has not already been released by actuation of relay 81).

The opening of contacts 119 when relay 117 is deenergized deenergizes the solenoid 28' of the rack end air supply valve 28, causing this valve to close. This closes off the compressed air which was pushing the pig from right to left, so the pig comes to a stop in its "home", pipe 16, against flange 17.

The opening of contacts 118 when relay 117 is deenergized removes the voltage which was applied to "trip" winding 26' of rack vent valve 26.

Relay 100, when energized, locks itself in through a pair of locking contacts 120 and the normally closed contacts 121 of time delay relay 106.

Actuation of relay 100 causes closing of its contacts 122, completing an a.c. energization circuit to the "open" coil 26'' of rack vent valve 26. Rack vent valve 26 then opens, and latches open.

Actuation of relay 100 also causes closing of its contacts 123, which completes an obvious energization circuit for coil 124 of time delay relay 106. After the 5-second "on" time delay provided by relay 106, its contacts 105 open, and its contacts 121 open.

Opening of contacts 105 of relay 106 releases relay 102, which recloses its contacts 33 to reset the pushbuttons 32 and 73 for the next operation. Opening of contacts 107 of relay 102 breaks the energization circuit through the "pig on" light 108, causing this light to go out.

Opening of contacts 121 of relay 106 releases relay 100, which by opening its contacts 123 deenergizes coil 124 and resets relay 106 to the position illustrated in the drawing.

The entire system is now reset for the next operation. The vents 19 and 26 at the ends of the loading system are both open, all of the solenoid valves are closed, and the pig is in its "home" in pipe 16.

The pig-operated switches 22, 29, and 30 may be of the type known as "Uni-Tec Model 100–S Detector", each including a hermetically sealed normally open proximity switch, a permanent magnet assembly, and a hemispherically shaped pressure balanced probe for bidirectional operation. A detector of this type is actuated when a pig in passing causes the probe that projects into the I.D. of the pipe to be displaced. This displacement of the probe from the I.D. of the pipe raises the balanced magnetic assembly into the vicinity of the proximity switch. The switch (housed in a calibrated tube), upon being influenced by the magnets, first closes, and then opens when the pig passes on by, lowering the magnetic assembly again. This operation of the switches 22, 29, and 30 has been previously referred to in connection with the description of the circuit operation.

In the loading system of this invention, the pig used must negotiate several tee connections in the 4-inch line, such as at 6 and 9. It is therefore of a dual construction, such that it will span these tee connections without losing air seal. Refer now to FIGS. 3 and 4, which are a side view and an end view, respectively, of a pig which may be employed in this invention. In FIG. 3, the pig is schematically illustrated "at home", in pipe 16. The pig is based upon two identical solid round balls (spheres) 125 and 126 each 4 inches in diameter and preferably made of the synthetic elastomeric material known as Neoprene. In this connection, it will be remembered that the pipeline 7, and the pipes 16 and 23, are all 4 inches in diameter.

A hole seven-sixteenths inch in diameter is drilled diametrically through each of the balls, in a direction perpendicular to the Neoprene ball laminations, and in the assembled pig a ½-inch diameter rod 127, 9 ⅝ inches long and threaded at each end, extends through the holes in the two balls. Thus, the balls are in effect mounted upon the rod 127 and are held together thereby, as will become apparent. The balls are spaced apart along rod 127 by means of a piece 128 of ½-inch pipe which surrounds the rod, a pair of ½-inch hardened round washers 129 being utilized, one at each end of the pipe 128 and tack welded thereto. By way of example, the subassembly of pipe 128 and washers 129 may have an overall length (parallel to the axis of rod 127) of 2 inches.

A counterbore 130, 1 ⅝ inch in diameter and about 1 inch deep, is formed at the outer end of the diametral hole in sphere 125, and in this counterbore a permanent-type connection of sphere 125 to rod 127 is effected. A ½-inch hardened round washer 131 is placed over the end of rod 127, and a regular hex nut 132 is threaded onto rod 127 and is then tack-welded to the threaded rod 127.

A counterbore 133, similar to counterbore 130, is formed at the outer end of the diametral hole in sphere 126. At this end, a ½-inch hardened round washer 134 is used, followed by a lock washer 135 and a hex nut 136, which latter is threaded onto rod 127 and is then tack-welded to the threaded rod 127. It should be apparent that the two spheres 125, 126 are held together in spaced relation by means of the construction described, including items 127–136.

When the dual-sphere pig is traveling through a pipeline, only one of the spheres at a time will lose air seal at a tee connection (the other sphere retaining seal at this time), so the net result is that the pig will travel through tee connections without hanging up.

The invention claimed is:

1. A pig system comprising a fluid flow conduit of finite length, means providing a chamber communicating with one end of said conduit but outside of the flow path of fluid being pumped through said conduit, a pig normally resting in said chamber but adapted to sealingly move through said conduit, means rendered effective in response to manual operation of a switch to cause said pig to move from said chamber into said conduit and through said conduit from said one end thereof, and means operating automatically, in response to the arrival of said pig at the other end of said conduit, to cause said pig to move through said conduit from said other end thereof to said one end thereof and back into said chamber.

2. System according to claim 1, wherein said pig, when moving through said conduit from said one end thereof, pushes liquid present in said conduit toward said other end thereof.

3. System of claim 1, wherein the second-mentioned means comprises means operable to apply a pneumatic driving force to said pig.

4. System of claim 1, wherein the third-mentioned means includes means operable to apply a pneumatic driving force to said pig.

5. System of claim 1, wherein the third-mentioned means includes means operable to vent said chamber to atmosphere.

6. A pig system comprising a fluid flow conduit of finite length, means providing a chamber communicating with one end of said conduit but outside of the flow path of fluid being pumped through said conduit, a pig normally resting in said chamber but adapted to sealingly move through said conduit, a coupling between said chamber and a compressed air supply, said coupling including a first controllable valve; means acting in response to manual operation of a switch to cause opening of said valve, thereby to admit compressed air to said chamber to drive said pig from said chamber into said conduit and through said conduit, a coupling between the other end of said conduit and a compressed air supply, said last-mentioned coupling including a second controllable valve; means acting automatically, in response to the arrival of said pig at the other end of said conduit, to cause opening of said second valve, thereby to admit compressed air to the other end of said conduit to drive said pig from said other end thereof to said one end thereof and back into said chamber.

7. System defined in claim 6, including also means acting automatically, in response to the arrival of said pig at said other end of said conduit, for causing closing of said first valve.

8. System set forth in claim 6, including also a controllable vent valve for venting said chamber to atmosphere, and means acting automatically, in response to the arrival of said pig at said other end of said conduit, for causing opening of said vent valve.

9. System set forth in claim 6, including also a controllable vent valve for venting said chamber to atmosphere, means acting automatically, in response to the arrival of said pig at said other end of said conduit, for causing opening of said vent valve, and means acting automatically, in response to the arrival of said pig at said other end of said conduit, for causing closing of said first valve.

10. System of claim 6, wherein the automatic acting means includes a switch mounted in said conduit and actuated by the passage of said pig thereby.

11. System defined in claim 6, including also means acting automatically, in response to the return of said pig to said chamber, for causing closing of said second valve.

12. System of claim 11, wherein the means which acts automatically in response to the return of said pig to said chamber includes a switch mounted in said chamber and actuated by the passage of said pig thereby.

* * * * *